(12) United States Patent
Natanzon et al.

(10) Patent No.: US 11,283,867 B2
(45) Date of Patent: Mar. 22, 2022

(54) DECENTRALIZED AND DISTRIBUTED CONTINUOUS REPLICATION SYSTEM FOR MOVING DEVICES

(71) Applicant: EMC IP Holding Company LLC, Hopkinton, MA (US)

(72) Inventors: Assaf Natanzon, Tel Aviv (IL); Kfir Wolfson, Beer Sheva (IL); Jehuda Shemer, Kfar Saba (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 10 days.

(21) Appl. No.: 17/027,039

(22) Filed: Sep. 21, 2020

(65) Prior Publication Data

US 2021/0006620 A1 Jan. 7, 2021

Related U.S. Application Data

(63) Continuation of application No. 16/035,235, filed on Jul. 13, 2018, now Pat. No. 10,791,173.

(51) Int. Cl.
*H04L 29/08* (2006.01)
*H04L 9/06* (2006.01)
*G06F 11/16* (2006.01)
*H04L 67/1095* (2022.01)
*H04L 67/1097* (2022.01)

(52) U.S. Cl.
CPC ...... *H04L 67/1095* (2013.01); *G06F 11/1658* (2013.01); *H04L 9/0637* (2013.01); *H04L 67/1097* (2013.01); *H04L 2209/38* (2013.01)

(58) Field of Classification Search
CPC . H04L 67/1095; H04L 67/1097; H04L 67/12; H04L 9/0637; G06F 11/1658
See application file for complete search history.

(56) References Cited

U.S. PATENT DOCUMENTS

| | | | |
|---|---|---|---|
| 2005/0055698 A1* | 3/2005 | Sasaki | H04W 99/00 719/310 |
| 2014/0012799 A1 | 1/2014 | Eberlein et al. | |
| 2014/0019573 A1 | 1/2014 | Swift | |
| 2014/0379651 A1 | 12/2014 | Romatoski | |
| 2015/0331632 A1* | 11/2015 | Slik | G06F 11/14 711/154 |
| 2015/0331744 A1* | 11/2015 | Slik | H04L 29/08 714/764 |
| 2015/0331775 A1* | 11/2015 | Slik | G06F 11/1451 714/6.23 |
| 2016/0042338 A1* | 2/2016 | Jooste | G06Q 20/326 705/21 |
| 2016/0381114 A1* | 12/2016 | Best | H04W 76/10 455/411 |
| 2017/0357647 A1 | 12/2017 | Fiero | |
| 2019/0072390 A1 | 3/2019 | Wang et al. | |
| 2019/0222756 A1 | 7/2019 | Moloney et al. | |
| 2019/0266886 A1 | 8/2019 | Jiang et al. | |

* cited by examiner

*Primary Examiner* — El Hadji M Sall
(74) *Attorney, Agent, or Firm* — Workman Nydegger

(57) ABSTRACT

A replication system for data of mobile devices is disclosed. The data of a mobile device is uploaded to stations in an area. Metadata associated with the objects is stored in a centralized or decentralized system. The metadata can be accessed to identify the stations storing the device's objects and the data of the mobile device can then be retrieved from the stations and reconstructed.

20 Claims, 4 Drawing Sheets

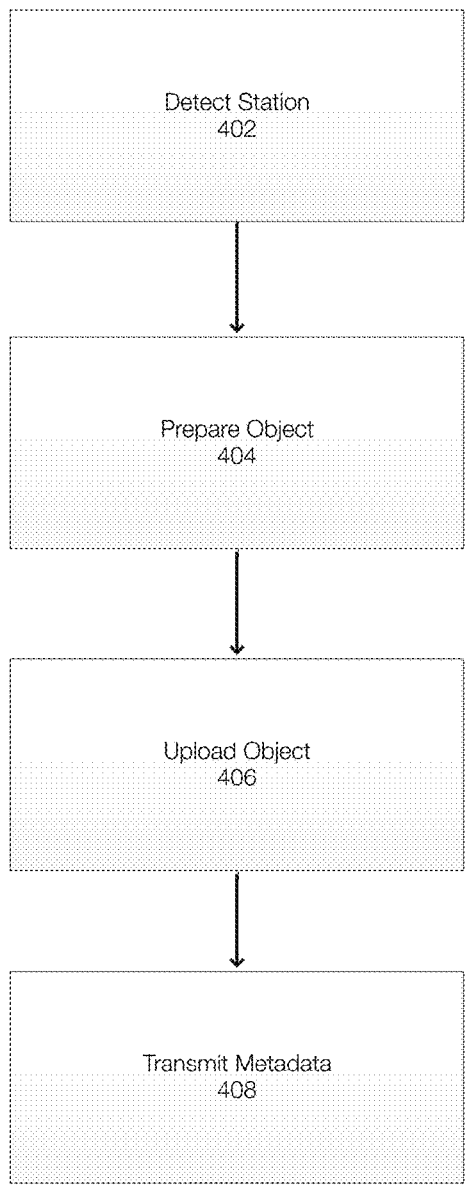
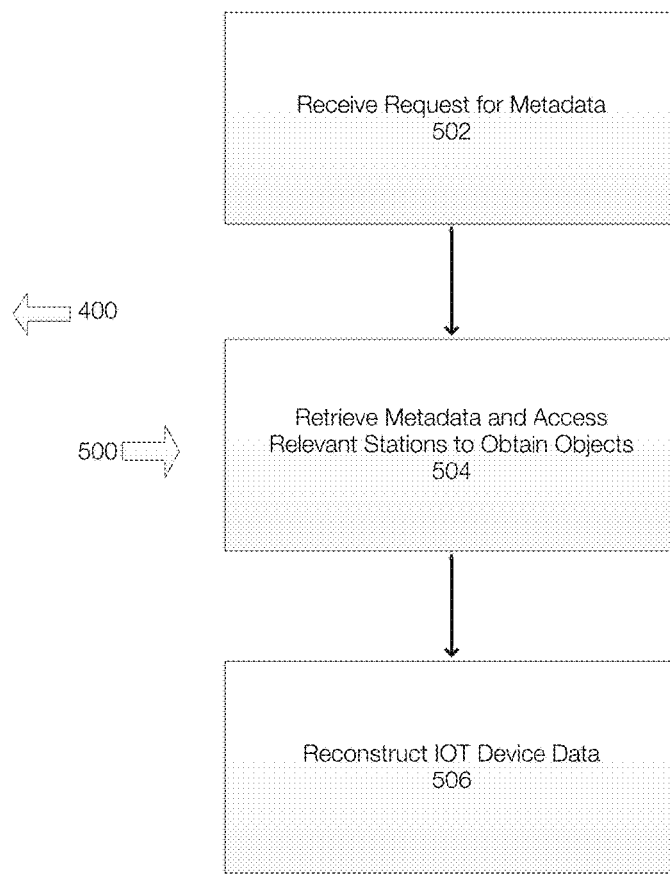
Figure 4
Figure 5

DECENTRALIZED AND DISTRIBUTED CONTINUOUS REPLICATION SYSTEM FOR MOVING DEVICES

FIELD OF THE INVENTION

Embodiments of the present invention relate to systems and methods for a replication system for network connectable devices. More particularly, embodiments of the invention relate to a distributed and decentralized replication system for IOT (Internet of Things) devices.

BACKGROUND

The IOT is essentially a system of connected devices—devices that are connected to the Internet. Many of the devices purchased today, from cars to appliances to speakers, are connected to the Internet and are part of the IOT. Going forward, it is anticipated that the number of devices joining the IOT will increase.

Many of the devices joining the IOT will be mobile IOT devices such as cars and drones. These devices, however, will produce very large amounts of data—more than can be sent to the cloud.

Some of the devices may have some computing power and may be able to perform machine learning based algorithms locally or perform other processing. Other devices, however, will not have this ability even though they may be used in scenarios where data collection and retention is important. For example, drones may have less compute ability than cars. Notwithstanding the differences in computing power, it may be useful to collect and keep a copy of data generated or gathered by IOT devices such as cars and drones. This data can be used, for example, for analysis purposes (e.g., in vehicles including driverless vehicles) or evidence in the case of a crime or disaster. Further, the data stored on the device may not be available at the time the data is actually needed (e.g., an accident or fire destroys the onboard storage).

As previously stated, connected devices including connected mobile devices produce huge amounts of data. In fact, the amount of data projected to be produced by connected cars is substantially higher that the available 5G bandwidth. As a result, it will not be possible to create a backup copy of all data generated by connected devices. Further, the storage available on the connected devices themselves is limited and must be deleted as some point. As a result, all of the data cannot be kept for a long period of time and some of the data will be erased.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which:

FIG. 4 is a flow diagram illustrating an example of a method for replicating data; and FIG. 5 is a flow diagram illustrating an example of a method for reconstructing replicated data.

DETAILED DESCRIPTION OF SOME EXAMPLE EMBODIMENTS

Figure 1:
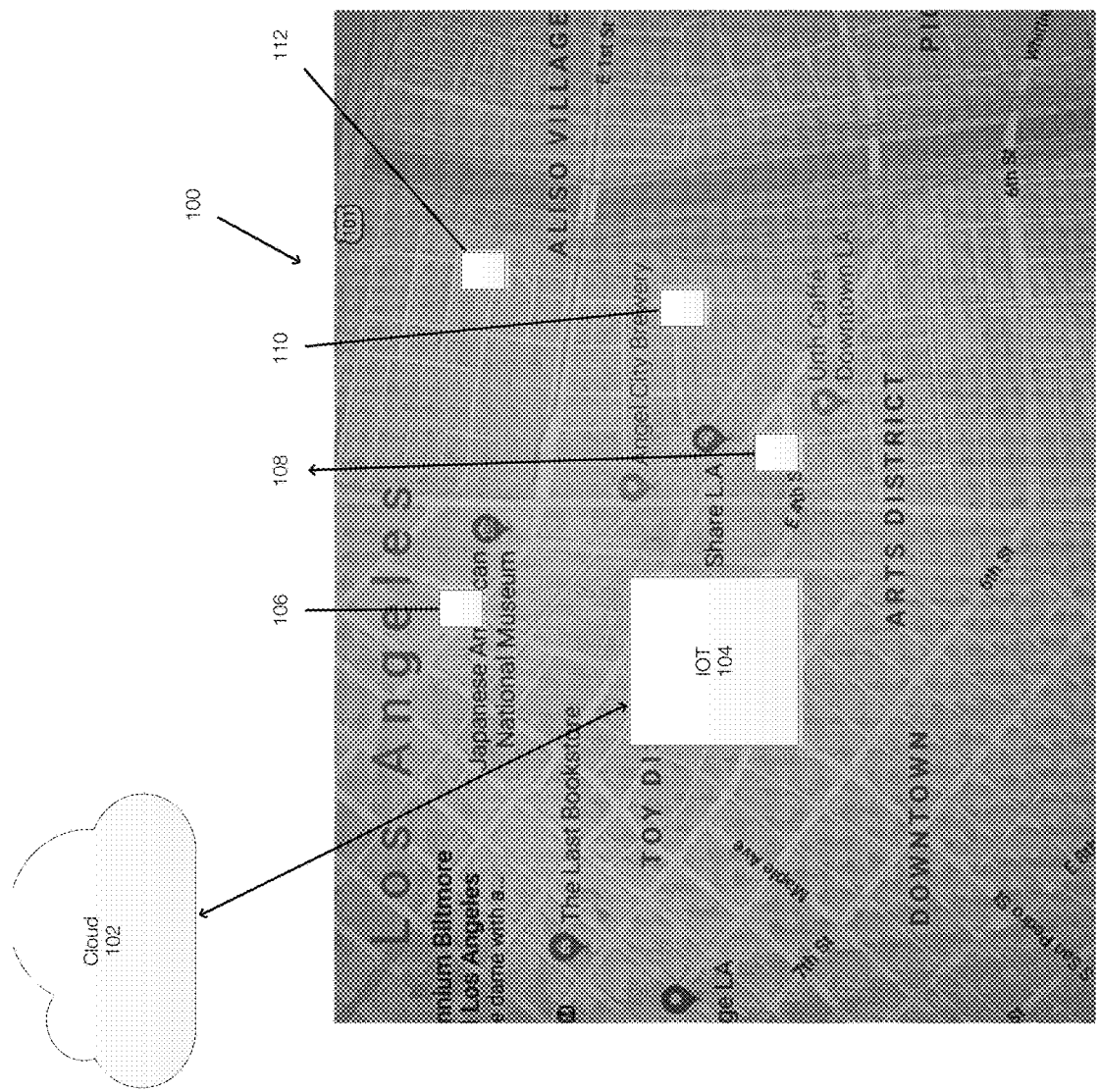
FIG. 1 illustrates an example of an area that includes IOT devices and that includes a replication system for replicating or backing up data associated with the IOT devices.

Embodiments of the invention relate to an asynchronous replication system for moving devices (and other devices) including Internet of Things (IOT) devices. The replication system may be distributed and/or decentralized. The replication system is configured to stream data to local stations or to other connected devices (such as cars or drones) using a fast local link such as, by way of example only, w-gig. Advantageously, this allows the latest data to be on the device itself and on one or more other locations.

Further, the data or different portions of the data of the IOT devices may be streamed to different stations. In one embodiment, the data may be packaged and transmitted in objects. IOT devices may transmit to a particular station as long as a connection is sufficient. Because the IOT devices are mobile, they may deliver objects to other stations overtime. Thus, depending on environmental factors, the objects will be streamed to available local stations or other devices. A car at a stoplight, for example, may stream multiple objects to a nearby station while the same car, after travelling further down the road, may send another object to another station.

For example, data associated with a car may include certain data such car speed, location, direction over the last time period, engine parameters (RM, heat), onboard computer statuses, sensor data (brake data, tire pressure data, oil data, etc.), video from the car's camera(s), audio recordings, and the like or combination thereof. Data from a drone may include height data, video data, sound data, device parameter data and the like.

For these devices, data is continually being generated. Embodiments of the invention replicate this data to stations. Once the data has been replicated, the IOT devices can free memory by deleting the replicated data. The device is not required to delete the data. However, as previously stated, because the data stored by the IOT device is continually being created and because the onboard memory is limited, it will be necessary to free memory at some point.

Embodiments of the invention enable the data to be streamed to one or more stations that may be positioned in the environment. Consequently, the data of a particular IOT device may be distributed across multiple stations. The data may be packaged into an object and provided with or associated with metadata. The metadata may include device identifiers such that the data of the device stored on the station can be identified from other objects stored at the same station.

Although not a requirement, each object may have pointers to the locations or stations in which previous objects of the same IOT device reside. Including metadata that allows the objects themselves to reference other objects is not a requirement, however, because metadata that allows the various objects to be retrieved and reconstructed is preferably transmitted to the cloud or to decentralized system such as a ledger or blockchain. This allows all of the data to be reconstructed as necessary from the distinct stations. The metadata that allows the objects to be located may be transmitted directly from the IOT device or forwarded by the receiving station.

The metadata about which station or IOT device contains the actual data of a particular IOT device can be stored in a centralized location (for example in the cloud), or in a decentralized list (like a blockchain). This metadata allows the entire data set to be rebuilt by obtaining the metadata and then reading the data from the correct stations.

The actual data included in an object can vary and may be set by default or set by a user or the like. For example, for a car, each object may contain samples from a period of time (e.g., 10 seconds). This may include audio of the last 10 seconds, video and other data as discussed herein.

The data may be replicated by having the IOT device periodically transmit data or objects to the closest station or to a station with which a connection can be established. In one example, this connection may not be a cellular connection, but is another wireless protocol. The data or objects may include changes from the last transmission or a sample of the changes. The data may also include a sub-set of all potential data. The object may include only sensor or point-in-time data.

The IOT device and/or the station may also send metadata describing the latest changes and/or a station identifier to the cloud or to a blockchain. This information allows the data stored at the various stations to be reconstructed. For example, in a situation where each object contains 10 seconds of video, the entire video stream can be collected from the stations and reconstructed.

FIG. 1 illustrates an example of an environment in which a replication system that is decentralized and distributed may be implemented. FIG. 1 illustrates an area 100 that is representative of a geographic area. The area 100 is not limited in size. FIG. 1 illustrates an IOT device 104 that is mobile and moving in the area 100. The IOT device 104 may be a car, a drone, a plane, a bicycle, a motorcycle, or any other mobile device. The IOT device 104 is configured to communicate over a wireless protocol. More specifically, the IOT device 104 may include a radio component, a memory, and a processor and is configured to acquire data, process data, package data and transmit data.

The stations 106, 108, 110 and 112 are examples of stations configured to receive and store data or objects at least from IOT devices. Because the stations are not typically mobile, they may be associated with a larger memory than the IOT device 104. In fact, the stations may be configured with very large memory in order to receive and store data received from multiple IOT devices. Each station may be configured to communicate with multiple IOT devices simultaneously. Each station may also be connected to the Internet and may include a processor and other hardware.

The stations may be configured to further transmit data to a repository, such as a data center, for long term storage. This can be accomplished at non-peak times for example. The stations can be incorporated into existing objects. For example, the stations may be incorporated into stoplights, into other signage or in other structures present in the area 100. The stations can be powered by the grid or using solar power where appropriate. The stations may have a wired and/or wireless connection to the Internet that is distinct from the wireless communications established with the IOT devices.

As previously stated, the IOT device 104 may be mobile or is moving in the area 100. As the IOT device 104 moves in the area 100, the IOT device may come into contact with or in the wireless range of a plurality of different stations. The IOT device 104 may establish contact with different stations at different times. When two or more stations are available, the station with the strongest signal may be selected. When close enough to a particular station to enable wireless communication, one or more objects may be transmitted from the IOT device 104 to the station (e.g., the station 108). When the IOT device 104 encounters another station such as the station 106, another subsequently generated object may be transmitted to the station 106.

For example, the IOT device 104 may be near (e.g., within the wireless range of) the station 108 and transmit one or more objects to the station 108. When the IOT device 104 moves away from (out of wireless range) the station 108 and comes close to the station 106, the IOT device 104 may transmit different (e.g., newer) objects to the station 106. This process can be repeated each time the IOT device 104 is near one of the stations in the area 100.

As a result, the data of the IOT device 104 is stored in a distributed manner in a replication system. For example, the IOT device 104 may deliver an object to the station 108 and then deliver an object to the station 106. Metadata that identifies the stations storing the objects of the IOT device 104 and that associates the objects with the IOT device 104 may be stored in the cloud or in a decentralized list. Alternatively, or in addition, the object stored at the station 106 may include sufficient information for the object stored on the station 108 to be located. This may include a pointer to the station 108 and information identifying the object stored at the station 108.

In one example, the metadata delivered to the cloud or stored in the decentralized list may include a time stamp, the station identifier, a hash of the data (to ensure that the data is not corrupted) and the IOT device identifier. With this metadata stored in the cloud or in the decentralized list, each of the stations 106, 108, 110 and 112 that store an object of the IOT device 104 can thus be identified independently of other stations. Further, the objects can be located independently of the order in which the objects were stored. The stations may be uniquely identified at least with respect to a defined geographic area.

If an accident occurs to the IOT device 104, certain information may be stored at the IOT device 104. If the data stored on the IOT device 104 is not available (damaged, deleted, etc.), then the copies of the data delivered to one or more of the stations can be accessed. In an accident or for other reasons, objects from all associated IOT devices can be evaluated.

As previously stated, the data stored locally on the stations can be accessed using a centralized system and/or a decentralized system. In one example, the IOT device 104 (or the stations receiving the objects) may send metadata to the cloud 102. The metadata sent to the cloud identifies the station that store the objects of the IOT device 104. Alternatively, a blockchain could be used to store information that identifies which stations store the objects of the IOT device 104.

Because the amount of data received by the stations is large, the objects delivered to the stations may also be subject to a retention policy. The objects may be erased after a certain time period or transmitted to a less expensive low tier storage.

A retention policy will allow the data to be erased after a period of time and the policy can be set when the objects are being created, and can be modified by using the central cloud or the block chain list.

One advantage of using a blockchain is that a completely decentralized replication system is obtained. If metadata is relatively small is size, sending the metadata to cloud should not be problematic (for example every minute send metadata on the location of the last objects). This schedule can be adjusted based on when an object is sent. For example, metadata may be sent every time an object is sent or when an object is sent to a different station.

Figure 2:
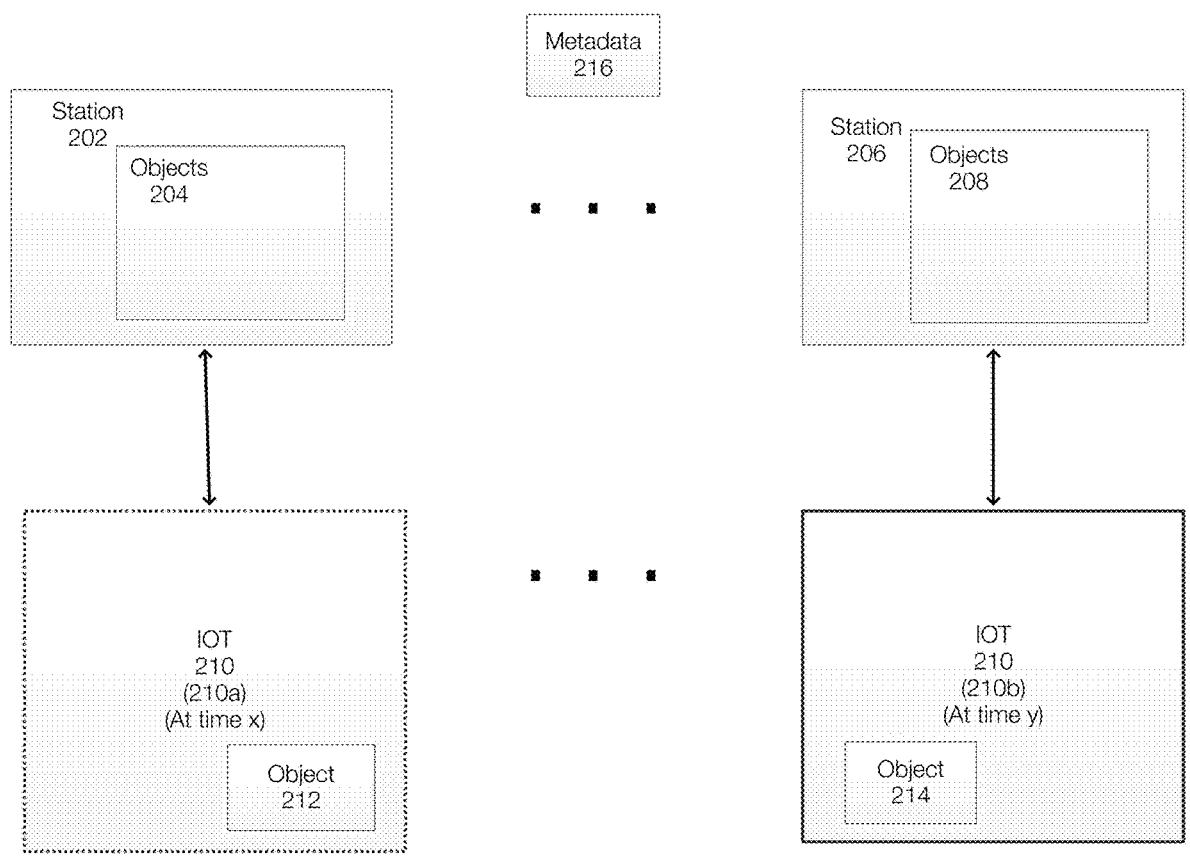
FIG. 2 is a block diagram illustrating an example of data replication in an IOT device.

FIG. 2 illustrates an example of a replication system. The replication system shown in FIG. 2 illustrates an IOT device 210 at two points in time (IOT 210a at time x) and (IOT 210b at time y). At time x, the IOT 210a is near or able to communicate with a station 202. The object 212 is thus transmitted to and stored by the station 202. The object 212 is stored along with other objects stored by the station 202.

At time y, the IOT 210b is near or within range of the station 206. The IOT 210b transmits an object 214 to the station 206, which is stored in the objects 208. At time y (a similar process occurs at other times with other stations).

In this example, metadata 216 is also generated and stored in a centralized system or a decentralized system. The metadata 216 may be generated by the IOT device 210 or by the stations and may be transmitted by the IOT device or by the stations to the replication system. The metadata 216 may identify or associate the station 202, the object 212, a timestamp, the IOT device 216 or the like. The metadata 216 thus allows all stations storing objects associated with the IOT device 210 to be located and accessed. Alternatively, the object 214, stored in the objects 208, points to the object 212, stored in the objects 204. This allows the objects to be identified in another manner if the centralized/decentralized system is not available.

FIG. 2 illustrates that the stations 202 through 206 may store a series of linked objects. The metadata 216 can be used to retrieve the objects and reconstruct or evaluate the associated objects or data. The blockchain or cloud data may also allow objects to be recovered even if the data or an object is no longer available at a particular station due, for example, to a retention policy. Thus, if a series of objects includes three objects, it may be possible to retrieve one or more of these objects in any order as long as they are still stored at the stations.

Regardless of where the metadata 216 is stored, the entire data set or portions thereof can be obtained and rebuilt by obtaining the metadata and then reading the data from the appropriate locations.

Figure 3:
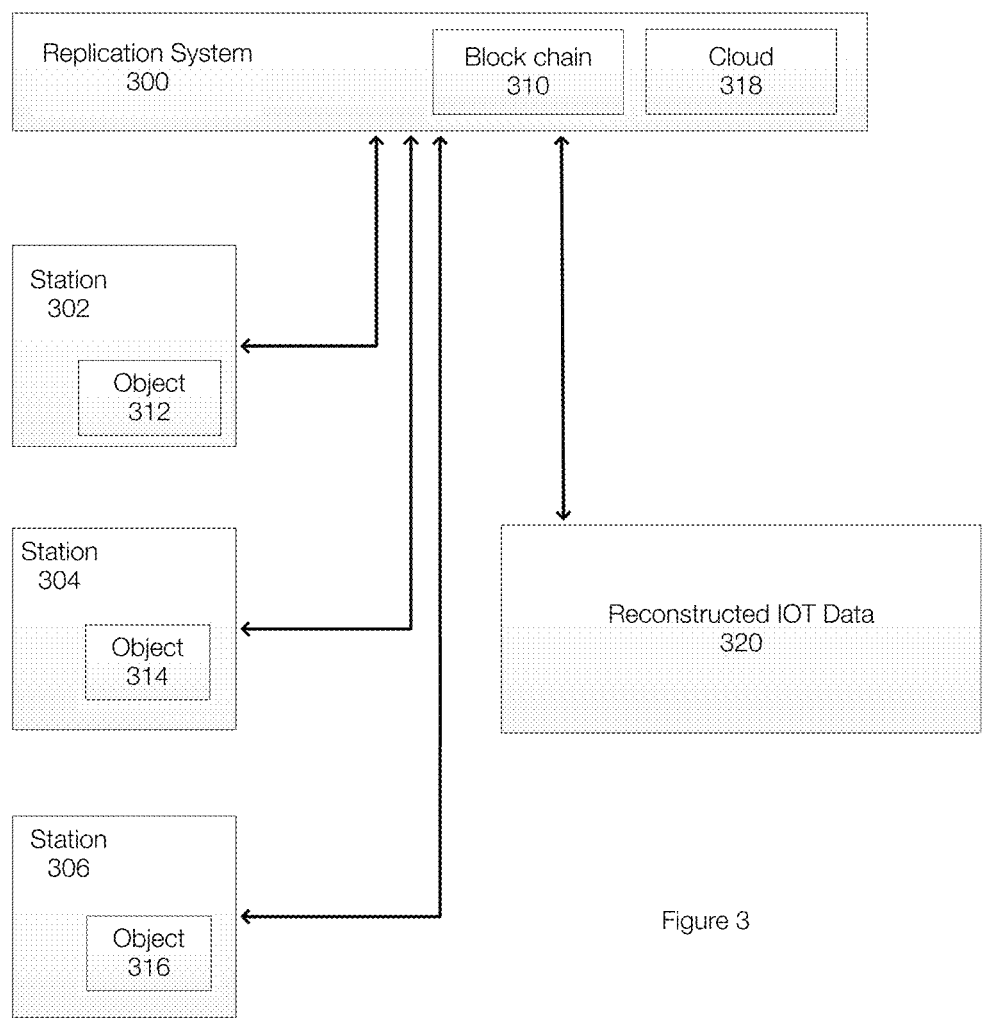
FIG. 3 illustrates an example of a system and method for reconstructing data pertaining to an IOT device.

FIG. 3 illustrates an example of a system for reconstructing IOT device data. In this example, the replication system 300 may be a cloud based application or decentralized application. Thus, the replication system 300 may store metadata in a centralized manner such as the cloud 318 or in a decentralized manner such as in a blockchain 310.

When access to the objects generated by or associated with an IOT device is needed, the appropriate metadata can be identified using a device identifier (e.g., a serial number, a registration number, or other identifier. In other words, access to a cloud relational database can be based on the device identifier and the blockchain can be similarly accessed.

Once access to the metadata is achieved, the replication system 300 will identify the appropriate stations or stations that store the IOT device's objects and then access those appropriate stations to retrieve the relevant objects. In this example, the replication system 300 may access the station 302, the station 304, and the station 306 to retrieve, respectively, the object 312, the object 314, and the object 316. These objects can then be processed and output as reconstructed IOT data 320. This may be presented in a display in text form. Some of the data may be converted to graphic form. For example, engine temperature, speed, direction and other parameters can be displayed graphically or the like.

The IOT data 320 can be reconstructed from whatever data is present or still stored at the stations 302, 304 and 306. For example, the object 314 may not be present on the station 304. In this case, the reconstructed IOT data 320 will include only the data from the object 312 and the object 316.

In another example, the hash included in the metadata may be used to ensure that the object or data retrieved from the stations is not corrupt or has not been changed.

FIG. 4 illustrates an example of a method for replicating data associated with an IOT device that is mobile. The method 400 may begin when an IOT device detects a station 402. Once a station is detected and a connection is established, the IOT device may prepare an object 404 and upload the object 406 to the station.

The IOT device may prepare multiple objects for transmission and transmit the objects. If an object is not fully transmitted before the connection is terminated or insufficient, the object is retransmitted to the next station encountered by the IOT device. The objects can be transmitted in any order and do not need to be transmitted in the order in which they are created. The associated metadata, such as the timestamp, allows the objects to be rebuilt in order. In another example, the object may be transmitted to another IOT device that may have more storage if necessary. For example, a company may have multiple mobile IOT devices that are able to share data as discussed herein. Typically, the IOT device's data is transmitted to a station directly or forwarded to a station by another IOT device.

This process occurs and the IOT device moves into and out of the ranges of the various stations located in an area. Whenever an IOT device is in range of a station, objects can be transmitted to that object.

At 408, metadata is transmitted to the replication system and stored in a cloud based database, in a decentralized ledger or blockchain, or in another suitable manner. This metadata is transmitted when possible or is forwarded by the stations.

FIG. 5 illustrates an example of a method for rebuilding the data of an IOT device from a replicated system. Initially, a request is received for the metadata 502. The request typically identifies the IOT device so that the relevant metadata can be identified and returned in response to the request. Once the metadata is retrieved 504, the stations identified in the metadata are accessed 504 to obtain the relevant objects. These objects are then reconstructed 506 into the IOT device's data. Reconstructing the data may include ensuring that the retrieved data has not been corrupted or changed, based for example on a hash included in the metadata.

Thus, the latest data associated with an IOT device may be available at the device itself It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for reconstructing data of a mobile device, the method comprising:
   receiving, at a replication system, a request for the data of the mobile device, wherein the request includes a mobile device identifier;
   accessing metadata on the replication system and identifying one or more relevant data objects by utilizing the mobile device identifier to find metadata with the same mobile device identifier;
   identifying locations of the one or more relevant data objects on one or more stations from the metadata of the mobile device;
   retrieving the relevant data objects from the one or more stations identified in the metadata; and
   reconstructing the data from the retrieved data objects.

2. The method of claim 1, further comprising storing the objects at the plurality of stations, wherein the objects are uploaded to the stations from the mobile device.

3. The method of claim 1, further comprising displaying the reconstructed data on a display in text or graphics.

4. The method of claim 1, further comprising accessing the metadata from a cloud repository.

5. The method of claim 1, further comprising accessing the metadata from a decentralized system, the decentralized system including a block chain.

6. The method of claim 1, wherein the metadata includes a timestamp for each object, a hash of data of each object, and a station identifier.

7. The method of claim 1, further comprising verifying that the data from the retrieved objects has not been changed or corrupted before reconstructing the data of the mobile device.

8. The method of claim 1, further retrieving objects from the plurality of stations, wherein objects that are no longer stored at the objects are omitted from the reconstructed data.

9. The method of claim 1, wherein retrieving the relevant data objects from the one or more stations identified in the metadata includes:
   retrieving a first data object from a first station, wherein the first data object includes a pointer which identifies a location of a next data object;
   retrieving the next data object at the location identified by the first data object; and
   reconstructing the data from the retrieved data objects.

10. The method of claim 1, further comprising reconstructing the data even when at least one of the data objects cannot be retrieved.

11. A non-transitory computer readable medium comprising computer executable instructions that, when executed, perform a method for reconstructing data of a mobile device, the method comprising:

receiving, at a replication system, a request for the data of the mobile device, wherein the request includes a mobile device identifier;

accessing metadata on the replication system and identifying one or more relevant data objects by utilizing the mobile device identifier to find metadata with the same mobile device identifier;

identifying locations of the one or more relevant data objects on one or more stations from the metadata of the mobile device;

retrieving the relevant data objects from the one or more stations identified in the metadata; and reconstructing the data from the retrieved data objects.

12. The non-transitory computer readable medium of claim 11, further comprising storing the objects at the plurality of stations, wherein the objects are uploaded to the stations from the mobile device.

13. The non-transitory computer readable medium of claim 11, further comprising displaying the reconstructed data on a display in text or graphics.

14. The non-transitory computer readable medium of claim 11, further comprising accessing the metadata from a cloud repository.

15. The non-transitory computer readable medium of claim 11, further comprising accessing the metadata from a decentralized system, the decentralized system including a block chain.

16. The non-transitory computer readable medium of claim 11, wherein the metadata includes a timestamp for each object, a hash of data of each object, and a station identifier.

17. The non-transitory computer readable medium of claim 11, further comprising verifying that the data from the retrieved objects has not been changed or corrupted before reconstructing the data of the mobile device.

18. The non-transitory computer readable medium of claim 11, further comprising retrieving objects from the plurality of stations, wherein objects that are no longer stored at the objects are omitted from the reconstructed data.

19. The non-transitory computer readable medium of claim 11, wherein retrieving the relevant data objects from the one or more stations identified in the metadata includes:

retrieving a first data object from a first station, wherein the first data object includes a pointer which identifies a location of a next data object;

retrieving the next data object at the location identified by the first data object; and reconstructing the data from the retrieved data objects.

20. The non-transitory computer readable medium of claim 11, further comprising reconstructing the data even when at least one of the data objects cannot be retrieved.

* * * * *